United States Patent
Kurita

(10) Patent No.: US 6,608,974 B2
(45) Date of Patent: Aug. 19, 2003

(54) IMAGE FORMATION SYSTEM

(75) Inventor: Hiroshi Kurita, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/983,799

(22) Filed: Oct. 25, 2001

(65) Prior Publication Data

US 2002/0051198 A1 May 2, 2002

(30) Foreign Application Priority Data

Oct. 31, 2000 (JP) .................................... 2000-332951

(51) Int. Cl.$^7$ ................................................ G03G 15/00
(52) U.S. Cl. ........................................ 399/13; 399/12
(58) Field of Search ..................... 399/8, 9, 13, 81, 399/83, 12

(56) References Cited

U.S. PATENT DOCUMENTS 5,365,311 A * 11/1994 Matsuoka ................ 399/13
5,950,045 A * 9/1999 Nomura et al. ........... 399/81
5,953,552 A * 9/1999 Someya ................... 399/13

FOREIGN PATENT DOCUMENTS

| JP | A 5-116833 | 5/1993 |
| JP | A 6-138740 | 5/1994 |

* cited by examiner

*Primary Examiner*—Hoan Tran
(74) *Attorney, Agent, or Firm*—Oliff & Berridge, PLC

(57) ABSTRACT

An image formation unit (IOT) automatically detects the type of each of optional units connected to the image formation unit and the connection order and the number of the connected optional units when system power is turned on, and displays the detected information.

10 Claims, 13 Drawing Sheets

FIG. 7A

| BASIC FEATURES: OUTPUT | | BUILD JOB CONTROLS | CANCEL | SAVE |
|---|---|---|---|---|
| OUTPUT DELIVERY | OUTPUT ASSEMBLY | | OUTPUT DEVICE | |
| ☐ AUTO | ☐ COLLATED | | ○ STACKER | |
| ☐ FACE UP | ☐ UNCOLLATED | | ○ STAPLER/STACKER | |
| ☐ FACE DOWN | | | | |

FIG. 7B

| BASIC FEATURES: OUTPUT | | BUILD JOB CONTROLS | CANCEL | SAVE |
|---|---|---|---|---|
| OUTPUT DELIVERY | OUTPUT ASSEMBLY | | OUTPUT DEVICE | |
| ☐ AUTO | ☐ COLLATED | | ○ STAPLER/STACKER | |
| ☐ FACE UP | ☐ UNCOLLATED | | | |
| ☐ FACE DOWN | | | | |

FIG. 8A

| | BUILD JOB CONTROLS | CANCEL | SAVE |

OUTPUT CATCH TRAY
☐ STACKER TRAY
☐ TOP TRAY

STAPLING
☐ OFF
☐ SINGLE STAPLE
☐ DUAL STAPLE

OFFSET
☐ OFFSET
☐ NO OFFSET

FIG. 8B

| | BUILD JOB CONTROLS | CANCEL | SAVE |

OUTPUT CATCH TRAY
☐ STACKER TRAY
☐ TOP TRAY

STAPLING
☐ OFF
☐ SINGLE STAPLE
☐ DUAL STAPLE

STAPLE LOCATION
☐ POSITION 1
☐ POSITION 2

OFFSET
☐ OFFSET
☐ NO OFFSET

FIG. 11A

FAILURE INFORMATION
· FAILURE OCCURRED IN EJECTION UNIT (HCS).
　　FOR DETAILS, CHECK ON DISPLAY SCREEN
　　OF EJECTION UNIT (HCS).

FIG. 11B

FAILURE INFORMATION
　· FAILURE OCCURRED IN STACK TRAY.
　[ RECOVERY METHOD ]
　· OPEN INTERLOCK AND CHECK.

IMAGE FORMATION SYSTEM

BACKGROUND OF THE INVENTION

1. Field of the Invention

This invention relates to an image formation system made up of an image formation unit such as a laser beam printer, an ink jet printer, a digital copier, or a facsimile (FAX) and optional units that can be attached to the image formation unit and in particular to an image formation system in which the image formation unit can precisely keep track of a connection state of the optional units.

2. Description of the Related Art

As an art related to this kind of image formation system, JP-A-5-116833 (related art 1) discloses an art for determining a connection state between an image formation unit main body and various optional units.

However, the related art 1 assumes that an order in which various optional units are attached to the image formation unit should be uniquely predetermined, and if the optional units are connected in any desired order, what optional units are connected in what order cannot be determined.

JP-A-6-138740 (related art 2) discloses an art for displaying a connection state as an operator is made to specify actually connected optional units.

However, in the related art 2, it is feared that the operator may set a different unit from the actual unit by mistake.

As described above, the related art 1 assumes that the order in which various optional units are attached to the image formation unit should be uniquely predetermined, and if the optional units are connected in any desired order, what optional units are connected in what order cannot be determined. Thus, the related art 1 has various disadvantages in system expandability, compatibility with diversified optional units, and functional compatibility.

The above-described related art 2 has the disadvantage that it cannot keep track of the precise connection state of the optional units if the operator sets a different unit from the actual unit by mistake.

SUMMARY OF THE INVENTION

It is therefore an object of the invention to provide an image formation system for making it possible to precisely keep track of the connection state of optional units in an image formation unit to which the optional units are connected.

To achieve the object, according to a first aspect of the invention, there is provided an image formation system comprising an image formation unit main body capable of being connected to a plurality of optional units in series, wherein the image formation unit main body has a detection section adapted to detect the type of each of the optional units connected to the image formation unit main body, the connection order, and the number of the connected optional units when the system power is turned on; and a control section adapted to control the optional units and the image formation unit main body based on the information detected by the detection section.

According to the configuration, when the optional units are cascaded, what additional units are attached in what order with what number of the additional units is automatically sensed when the power is turned on. Thus, it is made possible to precisely keep track of the connection state of the optional units in the image formation unit to which the optional units are connected, so that the image formation system also becomes advantageous in system expandability, compatibility with diversified optional units, and functional compatibility.

According to a second aspect of the invention, there is provided the image formation system according to the first aspect of the invention, wherein the image formation unit main body gives a start instruction to a first optional unit at a preceding stage and a first optional unit at a following stage when system power is turned on;

if an nth optional unit at the preceding stage is further preceded by an n+1th optional unit, the nth optional unit at the preceding stage returns a connection request to the image formation unit main body, connects to the image formation unit main body based on a connection signal from the image formation unit main body responding to the connection request, and gives a start instruction to the n+1th optional unit;

if the nth optional unit at the preceding stage is not further preceded by any optional unit, the optional unit at the preceding stage returns a connection request to the image formation unit main body, connects to the image formation unit main body based on a connection signal from the image formation unit main body responding to the connection request, and sends a signal indicating that the optional unit at the preceding stage is at a start stage in relation to the image formation unit main body;

if an nth optional unit at the following stage is further followed by an n+1th optional unit, the nth optional unit at the following stage returns a connection request to the image formation unit main body, connects to the image formation unit main body based on a connection signal from the image formation unit main body responding to the connection request, and gives a start instruction to the n+1th optional unit following the optional unit;

if the nth optional unit at the following stage is not further followed by any optional unit, the nth optional unit returns a connection request to the image formation unit main body, connects to the image formation unit main body based on a connection signal from the image formation unit main body responding to the connection request, and sends a signal indicating that the nth optional unit is at the termination stage in relation to the image formation unit main body; and the detection section issues an information request to the optional units connected to the image formation unit main body in order to collect information on the optional units and detects the type of each of the optional units and the connection order and the number of the optical units connected to the image formation unit main body based on the collected information.

According to the configuration, when the optional units are cascaded, in the image formation unit to which the optional units are connected, it is made possible to automatically sense what additional units are attached in what order with what number of the additional units when the power is turned on.

According to a third aspect of the invention, there is provided The image formation system according to the first aspect of the invention, wherein the image formation unit main body further has a display section adapted to display a whole image of the system including the optional units detected by the detection section on an enlarged or reduced scale so that the whole image of the system falls within one display screen.

According to the configuration, if the system scale becomes large as a plurality of optional units are connected (attached), the whole image can be displayed in one display screen of the display means, so that the user can understand the connection state of the optional units at a glance.

According to a fourth aspect of the invention, there is provided the image formation system according to the first aspect of the invention,
- wherein the image formation unit main body and the optional units have notification sections adapted to communicate with each other, respectively;
- the optional units send performance information, which the optional units have, to the image formation unit main body when the system power is turned on;
- the control section of the image formation unit main body controls the optional units based on the performance information sent from the optional units;
- the image formation unit main body further has a display section; and
- the display section displays information indicating selectable function of each of optional units and information indicating limitations based on the performance information sent from the optional units.

According to the configuration, the image formation unit gathers the performance information (device performance information) from the optional units when the power is turned on, whereby what function and performance each attached optional unit has can be automatically determined when the system power is turned on, so that it is made possible to display the functions that can be selected on the display screen and control the optional units appropriately.

According to a fifth aspect of the invention, there is provided the image formation system according to the first aspect of the invention,
- wherein if an anomaly occurs in the optional unit, the optional unit sends information indicating occurrence of the anomaly and information indicating whether or not the basic function that the optional unit has can be provided to the image formation unit main body;
- the control section of the image formation unit main body controls the optional units based on the information indicating whether or not the basic function can be provided, sent from the optional units;
- the image formation unit main body further has a display section; and
- the display section displays information indicating selectable functions of the optional unit where the anomaly occurs and information indicating limitations on the selection based on the information indicating whether or not the basic function can be provided.

According to the configuration, if an unavailable state of the use function occurs because of a failure, etc., in the optional unit connected to the image formation unit, whether or not the basic function can be used can be easily determined. Thus, if a new optional unit is developed and attached and the image formation unit is notified of a new failure, the optional unit can be controlled easily.

According to the configuration, the image formation unit is notified of service available/unavailable information, so that if an unavailable state of the use function occurs because of a failure, etc., during the system operation, whether or not the system is to be stopped can be easily determined.

According to a sixth aspect of the invention, there is provided the image formation system according to the first aspect of the invention,
- wherein the optional unit comprises an information display section adapted to display information indicating detailed contents concerning the abnormal condition and information indicating a recovery method from the abnormal condition;
- when an anomaly occurs in the optional unit, the optional unit occurring anomaly notifies the image formation unit main body; and
- the image formation unit main body further has a display section; and
- the display section displays information indicating which optional unit the abnormal condition occurs in based on the notification of the abnormal condition notification section.

According to the configuration, if the system scale becomes large as a plurality of optional units are connected (attached), which optional unit the unavailable state of the use function because of a failure, etc., occurs in can be determined on the display screen of the image formation unit of the main unit to which the optional units are connected, and the more detailed contents of the unavailable state of the use function because of the failure, etc., can be checked and the recovery method from the loss state of the use function because of the failure, etc., can be precisely grasped on the display screen of each optional unit.

According to a seventh aspect of the invention, there is provided the image formation system according to the first aspect of the invention, wherein the image formation unit main body comprises a section adapted to control a place where remaining paper in the system is to be ejected when a paper jam occurs to the optional unit which is behind a position of the remaining paper and nearest to the image formation unit main body.

According to the configuration, when a plurality of optional units are connected to the output of the image formation unit, if a paper jam occurs, the remaining paper in the unit is ejected from the optional unit connected nearest to the image formation unit to which the optional units are connected, whereby it is made possible to drastically shorten the recovery time.

According to a eighth aspect of the invention, there is provided the image formation system according to the first aspect of the invention, wherein the optional units include a paper feeder for feeding record paper on which an image is to be recorded and an ejection unit for performing postprocessing to eject the record paper on which an image is recorded.

According to a ninth aspect of the invention, there is provided the image formation system according to the first aspect of the invention,
- wherein the image formation unit main body has a starting section adapted to start the optional units adjacent to the image formation unit main body;
- the optional units issue a connection request to the image formation unit main body if the optional units are not a termination of the optional units connected in series when the optional units are started by the starting section; and
- the optional units output a signal indicating that the optional unit is the termination of the optional units connected in series to the image formation unit main body if the optional unit is the termination of the optional units connected in series.

According to a tenth aspect of the invention, there is provided the image formation system according to the ninth aspect of the invention, wherein the optional unit output function information of the started optional unit to the image formation unit main body when the optional unit is started by the starting section.

BRIEF DESCRIPTION OF THE DRAWINGS

FIG. 4 is a schematic block diagram to show a start order of the units (IOT, HCF, HCS, and HCSS) shown in FIG. 2 when power is turned on.

FIG. 7 is a drawing to show display examples of function selection screen displayed on the display section of the IOT shown in FIG. 2.

FIG. 8 is a drawing to show display examples of function selection screen displayed on the display section of the IOT shown in FIG. 2.

FIG. 11 is a drawing to show examples of failure information display screen displayed on the display section of the IOT shown in FIG. 2.

DETAILED DESCRIPTION OF THE PREFERRED EMBODIMENTS

Referring now to the accompanying drawings, description will be given on a preferred embodiment of the invention.

Figure 1:
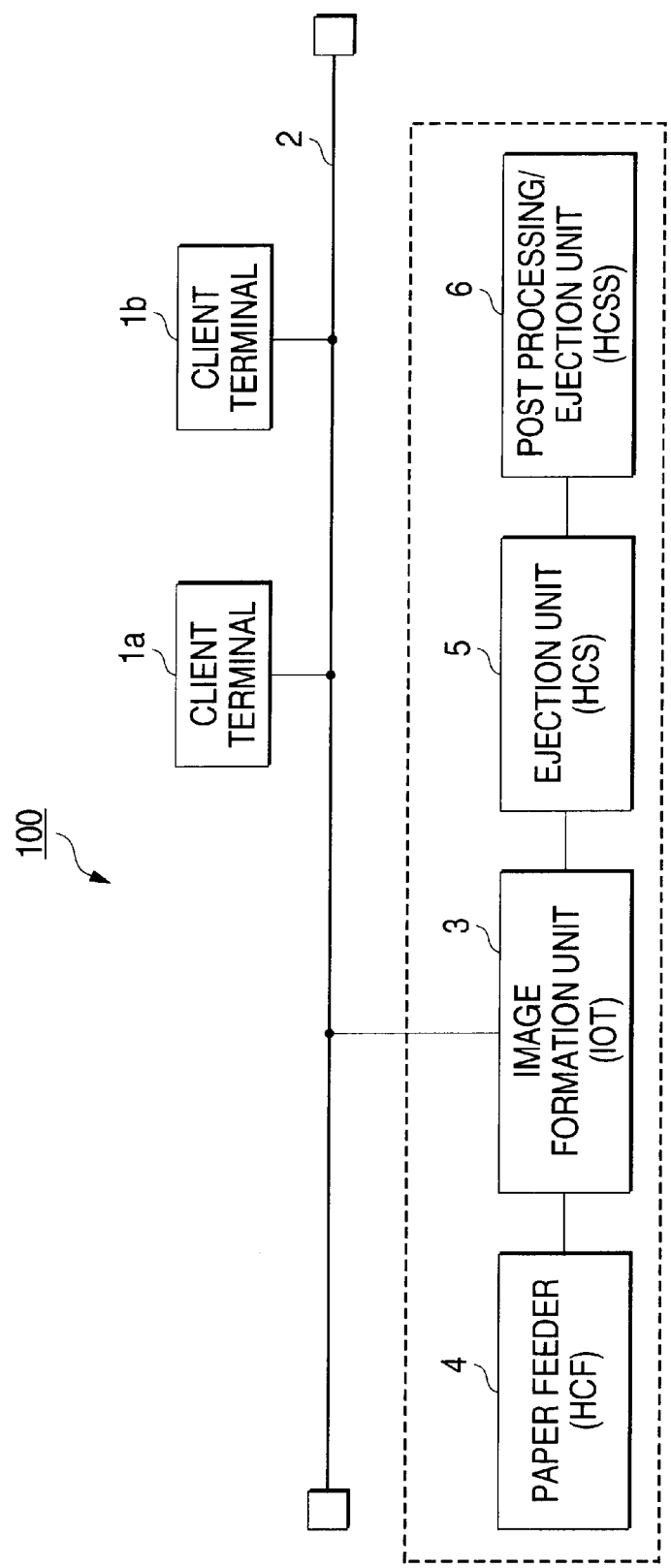
FIG. 1 is a block diagram to show one configuration example of an image formation system to which the invention is applied.

FIG. 1 is a block diagram to show one configuration example of an image formation system 100 to which the invention is applied. As shown in FIG. 1, the image formation system 100 has a configuration in which client terminals (personal computers (PCs) 1a and 1b are connected to an image output terminal (IOT) 3 (image formation unit) via a network 2 and a paper feeder (HCF) 4, an ejection unit (HCF) 5, and a postprocessing/ejection unit (HCSS) 6 are connected to the image formation unit 3.

A portion surrounded by a dotted line shown in FIG. 1 is a feature of the invention. Thus, in the invention, optional units having various functions, namely, the HCF 4, the HCS 5, and the HCSS 6 in the example are cascaded to the IOT 3, which is a main of the system.

In the embodiment, an image input unit or an image input terminal (IIT) maybe connected to the IOT 3 although not shown.

The IOT 3 forms an image on fed paper based on image data read through the IIT and forms an image on fed paper based on image data received from the client terminals 1a, 1b connected to the IOT 3 via the network 2.

The HCF 4 is a unit connected to an input side of the IOT 3, for feeding a large number of sheets of paper to the IOT 3.

The HCS 5 is a unit connected to an output side of the IOT 3 for stacking a large number of sheets of output paper on which images are formed in the IOT 3.

The HCSS 6 is an ejection unit connected to the output side of the IOT 3 for performing postprocessing (for example, stapling, etc.,) for output paper on which images are formed in the IOT 3 and then outputting.

Figure 2:
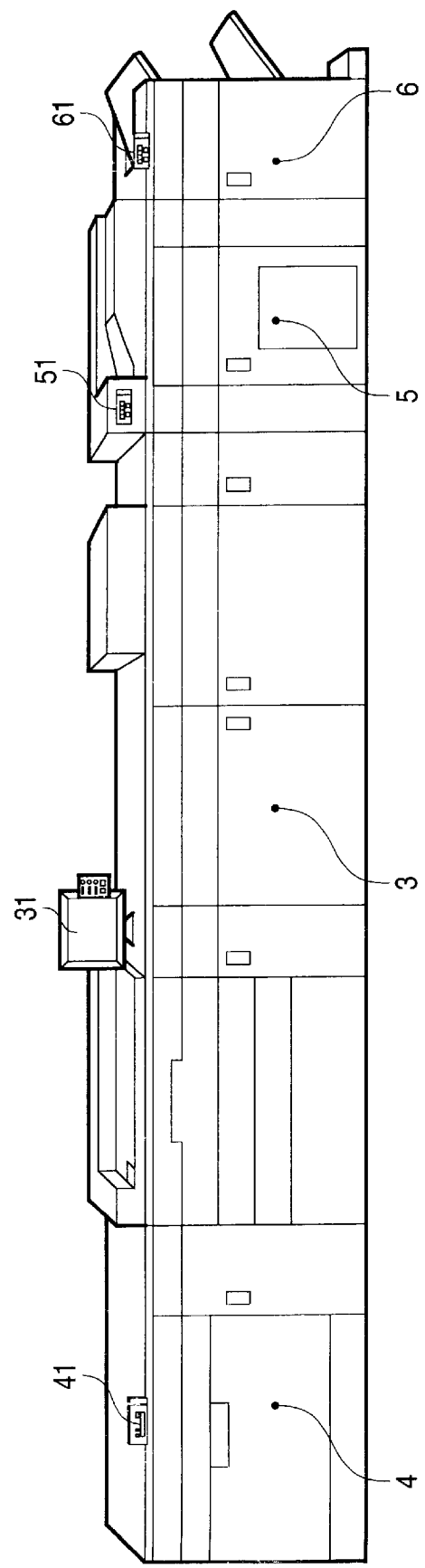
FIG. 2 is a schematic drawing to show an outer configuration of units (IOT, HCF, HCS, and HCSS) in a portion surrounded by a dotted line in the image formation system shown in FIG. 1.
Figure 3A:
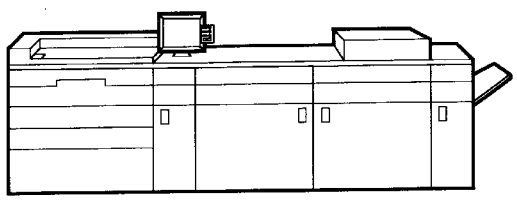
FIG. 3 is a drawing to show examples of connection patterns of the optional units to the IOT.
Figure 3B:
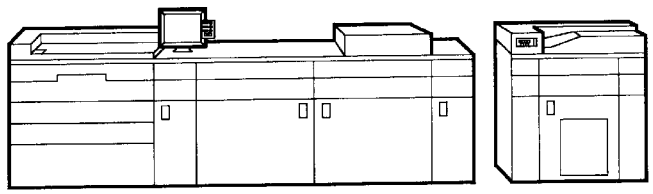
Figure 3C:
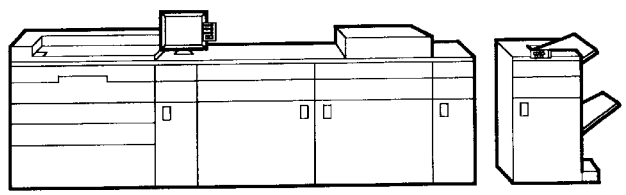
Figure 3D:
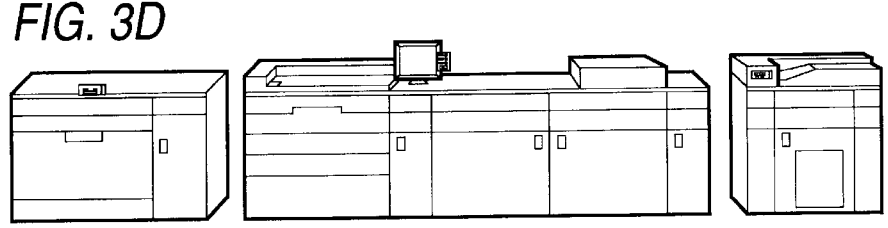
Figure 3E:
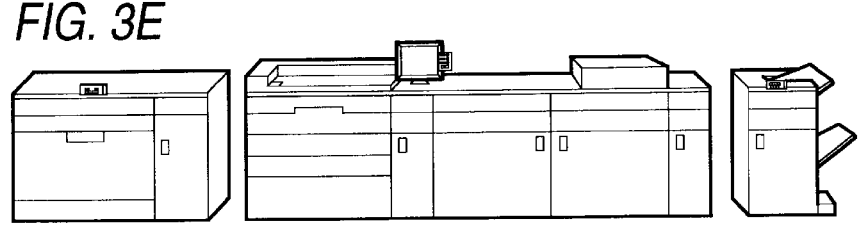
Figure 3F:
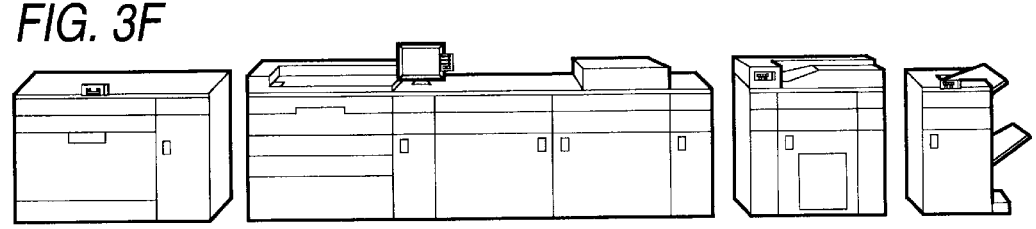

FIG. 2 is a schematic drawing to show an outer configuration of the units (IOT 3, HCF 4, HCS 5, and HCSS 6) in the portion surrounded by the dotted line in the image formation system 100 shown in FIG. 1.

As shown in FIG. 2, the IOT 3 comprises a display section 31 of a touch panel, etc., for executing use setting, etc., of the system, the HCF 4 comprises a display section 41 of a touch panel, etc., of its own, the HCS 5 comprises a display section 51 of a touch panel, etc., of its own, and the HCSS 6 comprises a display section 61 of a touch panel, etc., of its own.

In the invention, if loss of a use function occurs because of a failure, etc., in each optional unit, information indicating occurrence of the loss of a use function because of a failure, etc., in what optional unit is displayed on the display section 31 of the IOT 3, and information indicating details of the loss state of a use function because of a failure, etc., occurring in an optional unit and a recovery method from the loss state of the use function because of the failure, etc., is displayed on the display section 41, 51, or 61 of the corresponding optional unit.

In the embodiment, as the optional units connected to the IOT 3 to which the optional units are connected, the HCF 4 is connected to the input side of the IOT 3 and the HCS 5 and HCSS 6 are connected to the output side of the IOT 3, but the invention is not limited to this connection mode and is also applied to modes as shown in FIG. 3.

FIG. 3 is a drawing to show examples of connection patterns of the optional units to the IOT 3.

As shown in FIG. 3, pattern (a) shows a state in which no optional units are connected to the IOT 3, pattern (b) shows a state in which the HCS 5 is connected to the output side of the IOT 3, pattern (c) shows a state in which the HCSS 6 is connected to the output side of the IOT 3, and pattern (d) shows a state in which the HCF 4 is connected to the input side of the IOT 3 and the HCS 5 is connected to the output side. Pattern (e) shows a state in which the HCF 4 is connected to the input side of the IOT 3 and the HCSS 6 is connected to the output side. Pattern (f) shows a state in which the HCF 4 is connected to the input side of the IOT 3 and the HCS 5 and the HCSS 6 are connected to the output side.

Figure 4:
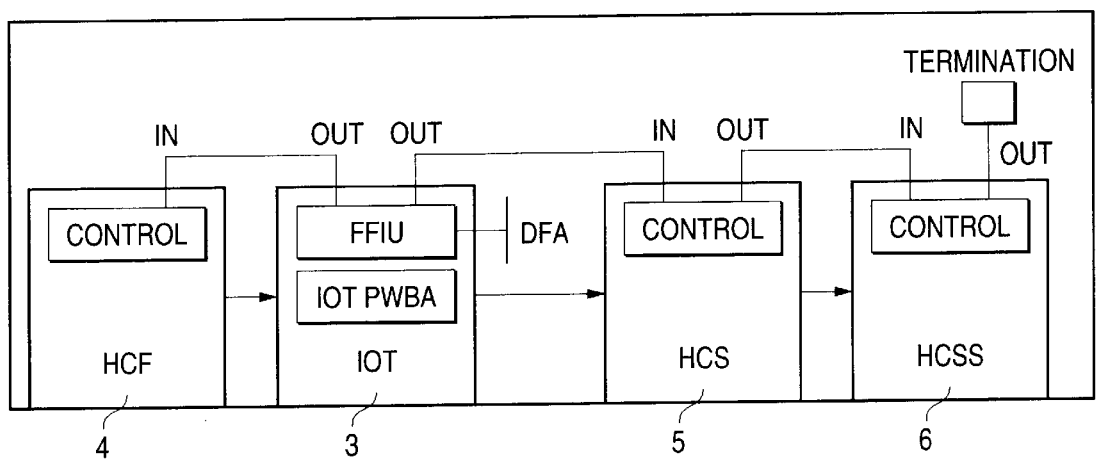

FIG. 4 is a schematic block diagram to show a start order of the units (IOT 3, HCF 4, HCS 5, and HCSS 6) shown in FIG. 2 when power is turned on.

As shown in FIG. 4, when the power of the system is turned on, namely, when the user (operator) turns on the power of the IOT 3, a start instruction is sent from the IOT 3 to the adjacent units.

That is, in the embodiment, first a start instruction is issued from the IOT 3 to the HCF 4 connected to the input side of the IOT 3. In this case, any other optional unit is not connected to the following stage of the HCF 4 with the IOT 3 as a reference and thus when starting the HCF 4 terminates, then the IOT 3 gives a start instruction to the HCS 5 connected to the output side of the IOT 3. In this case, the HCSS 6 is connected to the following stage of the HCS 5 with the IOT 3 as the reference and thus next a start instruction is sent from the HCS 5 to the HCSS 6. In the example, the HCSS 6 is a termination and thus notifies the IOT 3 that the HCSS 6 is the termination of the cascade, and the start processing when the power is turned on is terminated.

Thus, in the image formation system of the invention, a start instruction is issued in order from a unit at a preceding stage to a unit at a following stage with the IOT 3 to which the optional units are connected as a nucleus.

Figure 5:
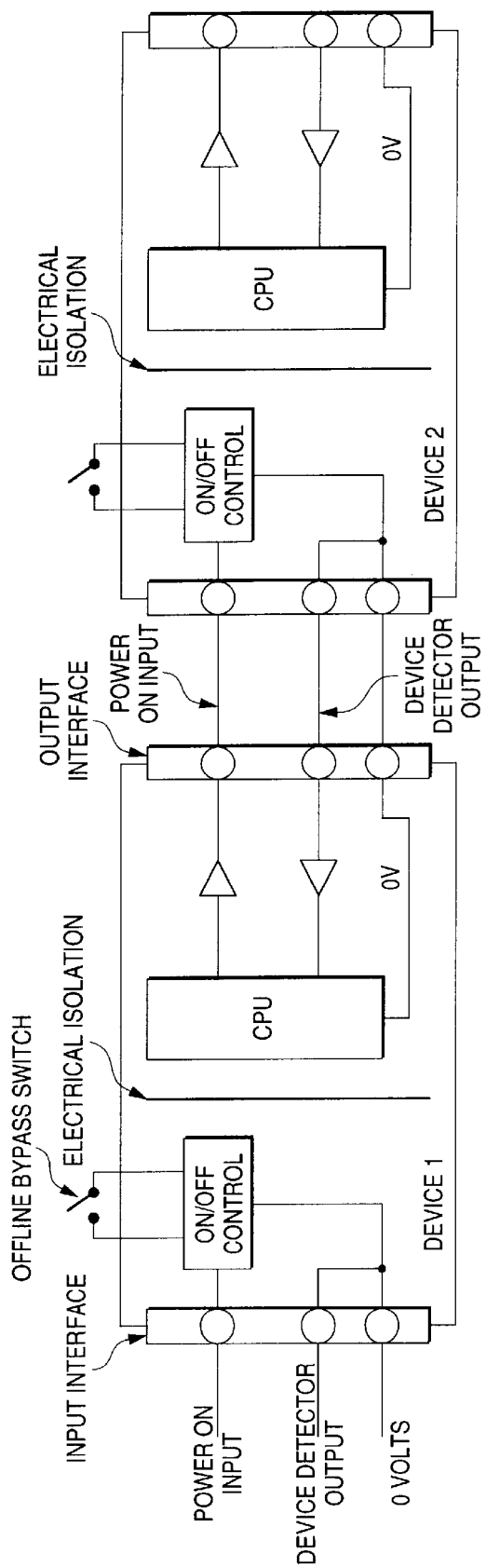
FIG. 5 is a diagram to show a circuit configuration for performing power on start processing of each unit shown in FIG. 4.

FIG. 5 is a diagram to show a circuit configuration for performing power on start processing of each unit (IOT 3, HCF 4, HCS 5, HCSS 6) shown in FIG. 4.

As shown in FIG. 5, each unit (IOT 3, HCF 4, HCS 5, HCSS 6) has a common configuration as the circuit for performing power on start processing.

Figure 6:
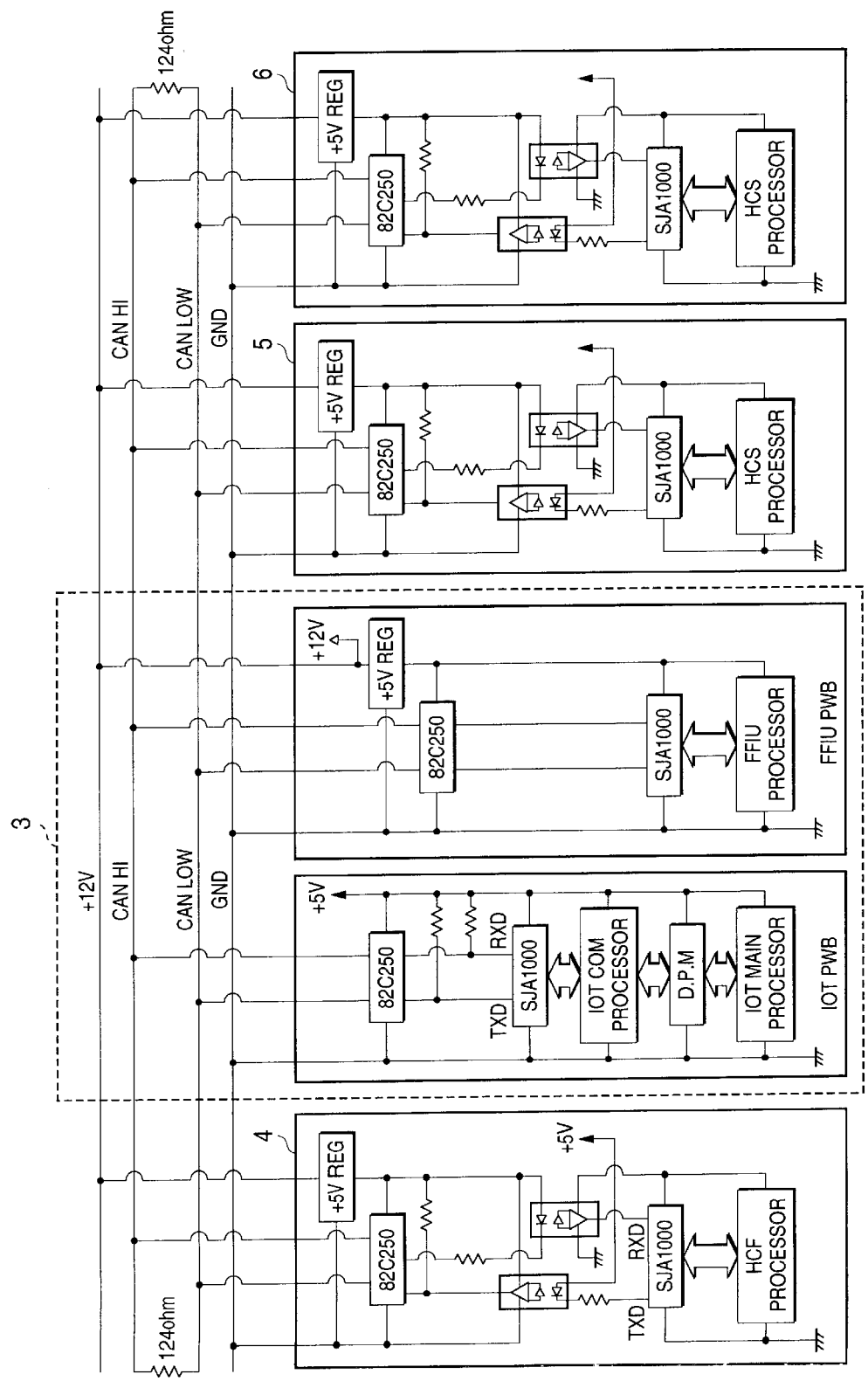
FIG. 6 is a diagram to show the circuit configuration more detailed than those in FIGS. 4 and 5.

FIG. 6 is a diagram to show the circuit configuration more detailed than those in FIGS. 4 and 5.

As shown in FIG. 6, each optional unit (IOT 3, HCF 4, HCS 5, HCSS 6) has a control section (processor) for controlling the whole unit, a communication control section for performing communication control with other units, and a communication interface serving as a communication interface with other units. An FFIU placed in the IOT 3 is a unit intervening between the IOT 3 and the optional units (HCF 4, HCS 5, HCSS 6) as a bridge between the units. In the embodiment, the FFIU is added to the IOT 3, but the invention is not limited to the configuration and the IOT 3 may have the function of the FFIU.

Figure 9:
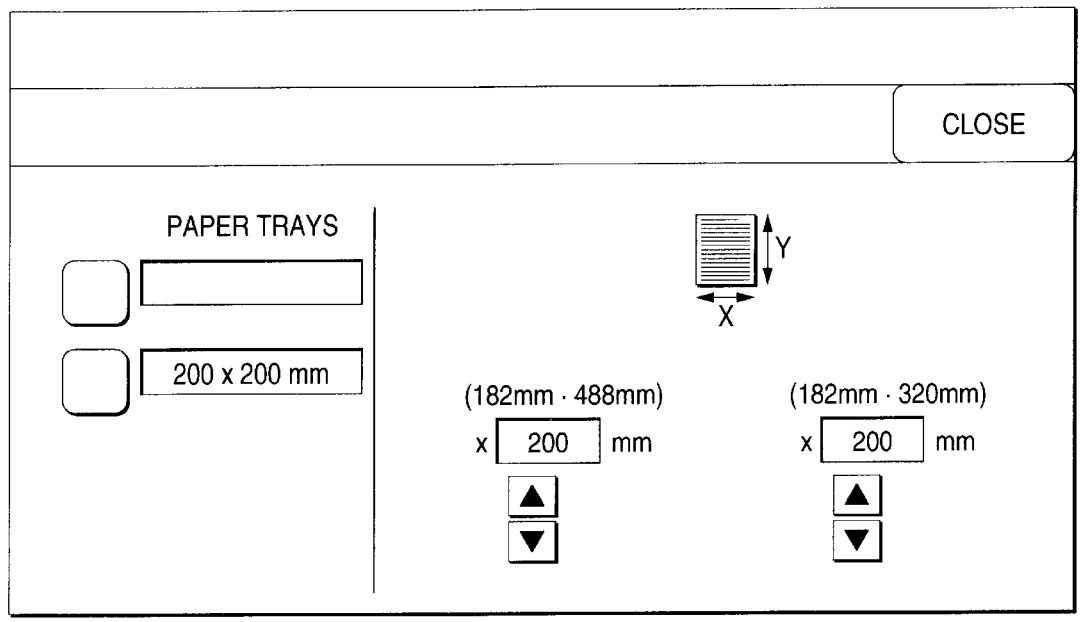
FIG. 9 is a drawing to show one display example of function selection screen displayed on the display section of the IOT shown in FIG. 2.

FIGS. 7 to 9 are drawings to show display examples of function selection screens displayed on the display section 31 of the IOT 3 shown in FIG. 2.

FIG. 7A shows one example of the function selection screen when the HCS 5 and the HCSS 6 are connected to the output side of the IOT 3 and FIG. 7B shows one example of the function selection screen when only the HCSS 6 is connected to the output side of the IOT 3.

FIG. 8A is a drawing to show one display example of the function selection screen displayed on the display section 31 when the user (operator) clicks on a Stapler/Stacker button icon displayed on the function selection screen shown in FIG. 7, and FIG. 8B is a drawing to show one display example of the function selection screen displayed on the display section 31 when the user (operator) clicks on a Single Staple button icon displayed on the function selection screen shown in FIG. 8A.

FIG. 9 is a drawing to show one display example of an irregular size input screen of the HCF 4.

FIG. 10 is a drawing to show examples of whole system image display screen displayed on the display section 31 of the IOT 3 shown in FIG. 2, and the whole system image is displayed in response to the connection state of the optional units detected when the system power is turned on.

Figure 10A:
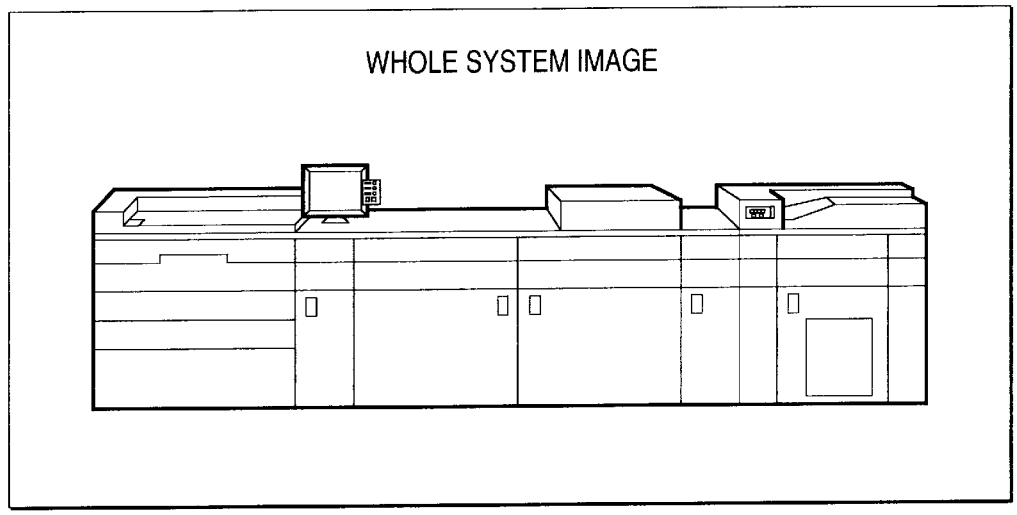
FIG. 10 is a drawing to show examples of whole system image display screen displayed on the display section of the IOT shown in FIG. 2.
Figure 10B:
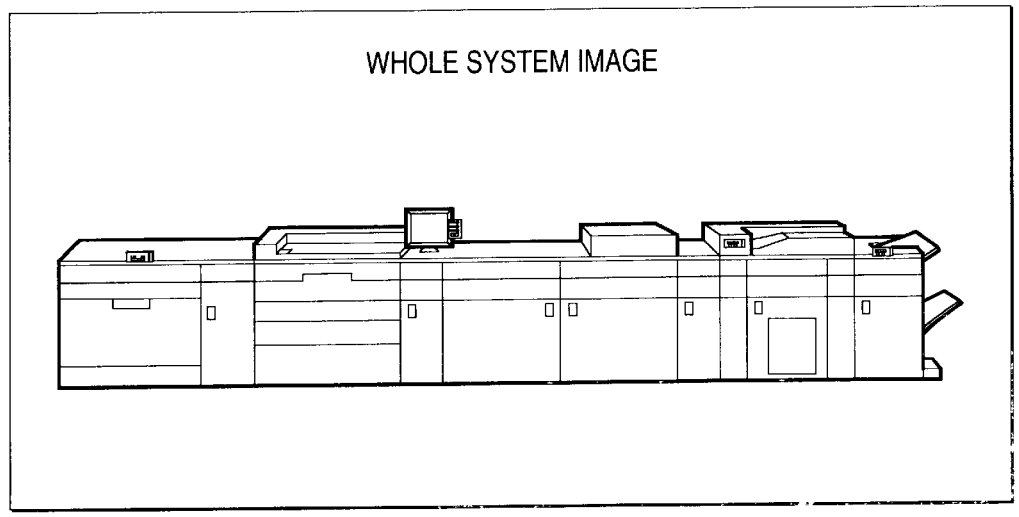

FIG. 10A shows display of the whole system image when only the HCS 5 is connected to the IOT 3, and FIG. 10B shows display of the whole system image when the HCF 4, the HCS 5, and the HCSS 6 are connected to the IOT 3.

Thus, in the invention, scaling down/up of the display size of the whole system image is adjusted and controlled in response to the number of the optional units connected to the IOT 3, namely, the system scale, so that the whole system image falls within one display screen. That is, the whole system image can be grasped at a glance without scrolling, etc.

FIG. 11 is a drawing to show examples of failure information display screen displayed on the display section 31 of the IOT 3 shown in FIG. 2, and the failure information display screen is displayed when the loss of a use function (unavailable state) occurs because of a failure, etc., while the system is operating.

FIG. 11A shows one display example of an outline of a failure displayed on the display section 31 of the IOT 3. In the example, a message of "Failure occurred in ejection unit (HCS). For details, check on display screen of the ejection unit (HCS)." is displayed as the failure information.

FIG. 11B shows one display example of details of failure displayed on the display section 51 of the HCS 5 where the failure occurred. In the example, a message of "Failure occurred in stack tray." is displayed as the failure detail information and a message of "Open interlock and check." is displayed as recovery method information.

Figure 12:
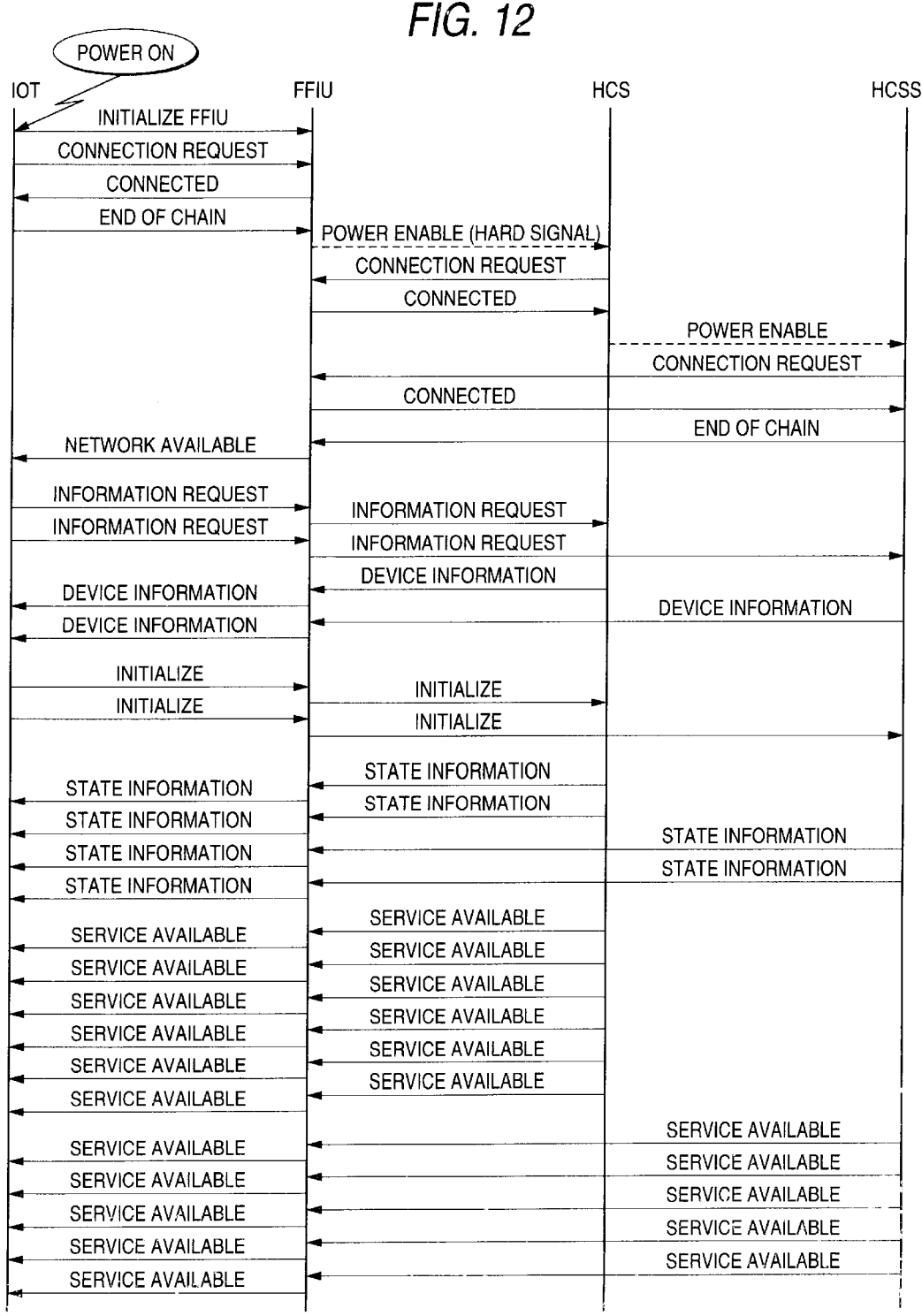
FIG. 12 is a sequence chart to show a control procedure when the system power is turned on among the units (IOT, HCF, HCS, and HCSS) shown in FIG. 2.

FIG. 12 is a sequence chart to show a control procedure when the system power is turned on among the units (IOT 3, HCF 4, HCS 5, and HCSS 6) shown in FIG. 2.

As shown in FIG. 12, to start the processing, first when the user (operator) gives a system power on instruction (presses a power on button), the IOT 3 instructs the FFIU placed in the IOT 3 to initialize, namely, sends an initialize FFIU command.

Then, the IOT 3 sends a connection request to the FFIU, namely, sends a Connection Request command.

The FFIU responds to the command with notification indicating that the FFIU has been connected to the IOT 3, namely, sends a Connected command.

Upon reception of the command, the IOT 3 does not involve any optional unit connected to the input side of the IOT 3 and thus notifies the FFIU that the IOT 3 is the termination of the input side, namely, sends an End Of Chain command.

Upon reception of the End Of Chain command, then the FFIU gives a power on instruction to the HCS 5 connected to the output side of the IOT 3 over a signal line of hardware, namely, sends a Power enable signal.

The HCS 5 responds to the signal with a connection request to the FFIU, namely, sends a Connection Request command.

The FFIU responds to the command with notification indicating that the FFIU has been connected to the HCS 5, namely, sends a Connected command.

Upon reception of the command, since the HCS 5 is not the termination of the output side, the HCS 5 gives a power on instruction to the HCSS 6 connected at the following stage over a signal line of hardware, namely, sends a Power enable signal.

The HCSS 6 responds to the signal with a connection request to the FFIU, namely, sends a Connection Request command.

The FFIU responds to the command with notification indicating that the FFIU has been connected to the HCS 5, namely, sends a Connected command.

Upon reception of the command, then the HCSS 6 notifies the FFIU that the HCSS 6 is the termination of the output side, namely, sends an End Of Chain command.

The FFIU receives the End Of Chain command and notifies the IOT 3 that the network is active, namely, sends a Network Available command because all optional units (HCS 5 and HCSS 6) connected to the IOT 3 are started.

Upon reception of the Network Available command, the IOT 3 instructs the FFIU to request information of the optional units HCS 5 and HCSS 6, namely, sends an Information Request command.

The FFIU receives the command and requests the optional units HCS 5 and HCSS 6 to send performance information, namely, sends an Information Request command.

The optional units HCS 5 and HCSS 6 receive the command and send model information of the units to the FFIU, namely, send Device Information.

As the contents sent from the HCS 5, the type and minimum size/maximum size information of paper that can be ejected for each top tray/stack tray, and the like are set. As the contents of Service Availability sent from the HCSS 6, restriction information of the type and minimum size/maximum size information of paper that can be handled by the function of each staple is set. The Device Information includes the Service Availability.

Upon reception of the Device Information from the optional units HCS 5 and HCSS 6, the FFIU sends the Device Information to the IOT 3.

Upon reception of the Device Information of the optional units, the IOT 3 instructs the FFIU to initialize the optional units, namely, sends an initialize command.

The FFIU receives the command and sends an initialize command to the optional units.

Upon reception of the initialize command, the optional units HCS 5 and HCSS 6 send information indicating the current state to the FFIU, namely, send State Information.

The optional units HCS 5 and HCSS 6 also send basic information as to what services can be provided.

Specifically, for example, as the contents of Service Available sent from the HCS 5, service information of top tray ejection function available, stack tray ejection function available, etc., is set and as the contents of Service Available sent from the HCSS 6, service information of front staple & stack tray ejection function available, rear staple & stack tray ejection function available, dual staple & stack tray ejection function available, etc., is set.

The FFIU receives the State Information and Service Available and sends the received information to the IOT 3.

Upon reception of the information, based on the received information, the IOT 3 displays the whole system image as shown in FIG. 10 so that the operator can understand at a glance what additional units are attached in what order with what number of the additional units, and also displays the functions that can be selected by the operator and restrictions on the selection and then makes the transition to a standby state.

According to this mechanism, if a different optional unit is later attached, it is possible to flexibly deal with the attachement.

Thus, according to the described processing procedure, if the system power is turned on, all optional units connected to the IOT 3 can be started in order and when the system power is turned on, the IOT 3 requests all optional units to send information of function that the optional units possess, so that the IOT 3 of the main component can automatically detect information as to what types of additional units are attached in what order with what number of the additional units and can display the information on the display screen. Thus, the precise connection state of the optional units can be grasped in the IOT 3 to which the optional units are connected, and the image formation system also becomes highly advantageous in system expandability and functional compatibility.

Figure 13:
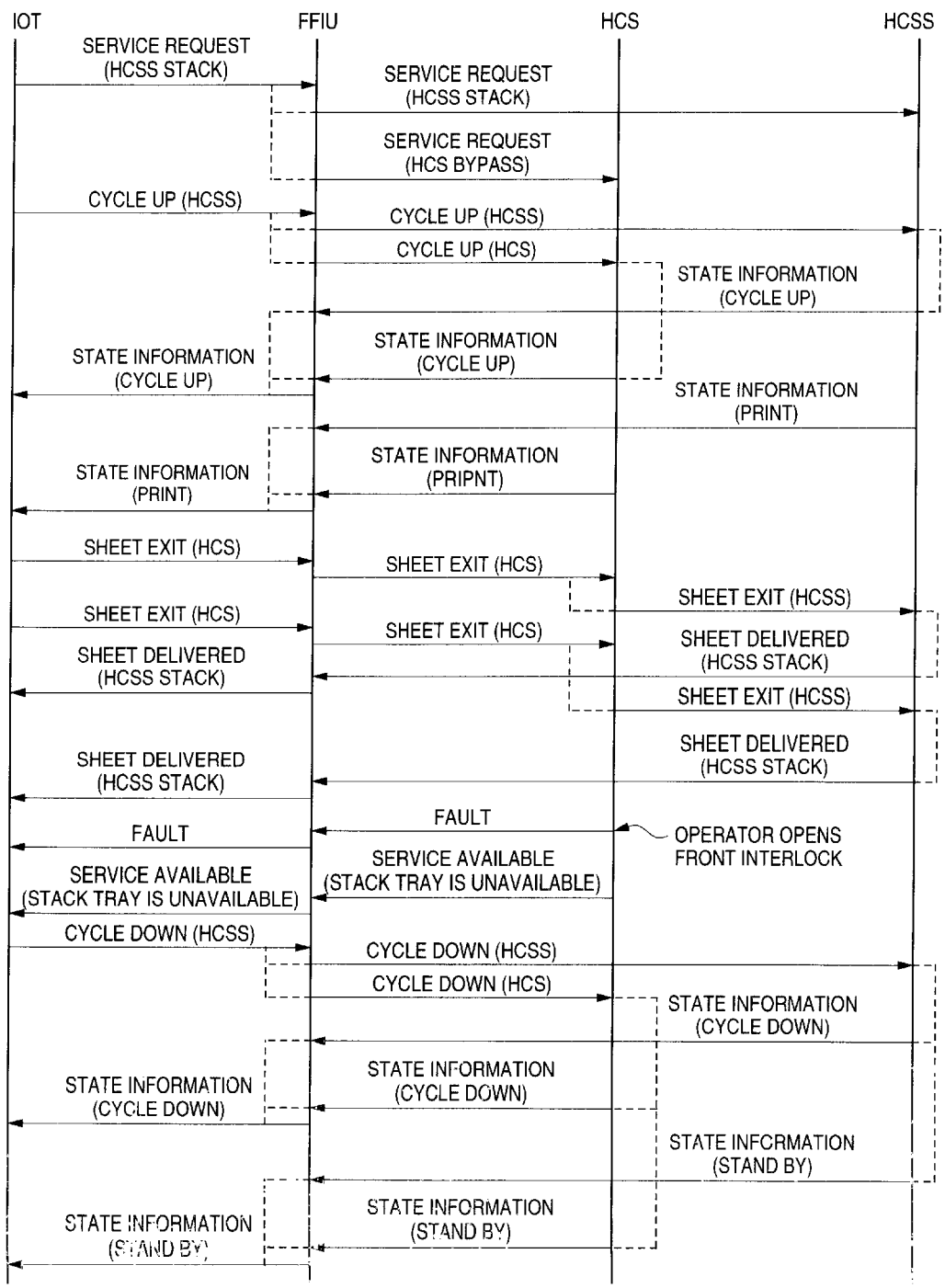
FIG. 13 is a sequence chart to show a control procedure for executing one job using the image formation system comprising the units (IOT, HCF, HCS, and HCSS) shown in FIG. 2.

FIG. 13 is a sequence chart to show a control procedure for executing one job using the image formation system comprising the units (IOT 3, HCF 4, HCS 5, and HCSS 6) shown in FIG. 2; particularly, in this case, FIG. 13 shows a control procedure when a failure occurs in an optional unit during execution of a job for stacking print paper in the HCSS 6. HCF 4 can feed a large amount of paper.

As shown in FIG. 13, to start the processing, first when the user (operator) uses the function selection screen previously described with reference to FIGS. 7 to 9 to give an instruction for stacking in the HCSS 6, the IOT 3 sends a request for stack service in the HCSS 6 to the FFIU, namely, sends a Service Request (HCSS Stack) command.

Upon reception of the command, the FFIU sends a Service Request (HCSS Stack) command to the HCSS 6 and also sends a request for bypass service in the HCS 5 to the HCS 5, namely, sends a Service Request (HCS Bypass) command.

Then, the IOT 3 sends a Cycle Up (HCSS) command to the FFIU. The FFIU receives the command and sends a Cycle Up (HCSS) command to the HCSS 6 and also sends Cycle Up (HCSS) to the HCS 5. The Cycle Up command is a trigger for shifting each of devices from a stand-by state to a print state in which paper can be handled. A device which has received the Cycle Up command, at first, shifts to a Cycle Up state where paper handling is in preparation and then, when the preparation is finished, the device shifts to the print state automatically.

Accordingly, the HCSS 6 sends information indicating the current state, namely, State Information (Cycle Up) to the FFIU, and the HSC 5 sends information indicating the current state, namely, State Information (Cycle Up) to the FFIU.

Then, the FFIU sends the received State Information (Cycle Up) to the IOT 3.

After this, the HCSS 6 sends information indicating the current state, namely, State Information (Print) to the FFIU, and the HSC 5 sends information indicating the current state, namely, State Information (Print) to the FFIU.

Then, the FFIU sends the received State Information (Print) to the IOT 3.

After this, the IOT 3 sends an instruction for ejecting a sheet in the HCS 5 to the FFIU, namely, sends a Sheet Exit (HCS) command.

The FFIU receives the command and sends a Sheet Exit (HCS) command of an instruction for ejecting a sheet to the HCS 5.

The HCS 5 receives the Sheet Exit (HCS) command and sends a Sheet Exit (HCSS) command to the HCSS 6.

The HCSS 6 receives the command and notifies the FFIU that a sheet in HCSS Stack job has been ejected, namely, sends a Sheet Delivered (HCSS Stack) command.

The FFIU receives the Sheet Delivered (HCSS Stack) command and sends the Sheet Delivered (HCSS Stack) command to the IOT 3.

In the example, at this point in time, the user (operator) opens the front interlock and thus the HCS 5 notifies the FFIU that the loss of the use function occurred, namely, sends a Fault command to the FFIU and also sends basic information indicating whether or not the basic function of the service that the HCS 5 has is available, namely, a Service Available command. In this case, the interlock of the stack tray is opened and thus information indicating that the stack tray is not available, namely, Stack Tray=Unavailable is set in the Service Available command.

The FFIU sends the Fault command and the Service Available (Stack Tray=Unavailable) command to the IOT 3.

Accordingly, based on the received information, the IOT 3 displays the functions that can be selected and the limitations on the selection on the display section 31 for the operator and also displays a message indicating that the loss of the use function occurred in the HCS 5 (see FIG. 11A). At this time, the HCS 5 displays the detailed information on the loss of the use function that occurred in the HCS 5 and recovery procedure information from the loss (see FIG. 11B).

After this, the IOT 3 sends a Cycle Down (HCSS) command to the FFIU. The Cycle Down command is a trigger for shifting each of devices from the print state in which paper can be handled to the stand-by state which is a waiting state. A device, which has received the Cycle Down command, shifts to a Cycle Down state and then, automatically shifts to the stand-by state.

The FFIU receives the command and sends a Cycle Down (HCSS) command to the HCSS 6 and also sends a Cycle Down command (HCS) to the HCS 5.

Upon reception of the Cycle Down (HCSS) command, the HCSS 6 sends the information indicating the current state, namely, State Information (Cycle Down) and State Information (Stand By) to the FFIU. Upon reception of the Cycle Down (HCS) command, the HCS 5 sends the information indicating the current state, namely, State Information (Cycle Down) and State Information (Stand By) to the FFIU.

Upon reception of the State Information (Cycle Down) and the State Information (Stand By), the FFIU sends the information to the IOT 3.

Accordingly, the IOT 3 terminates the processing of the job.

Generally, a large number of failures exist in each optional unit and thus when a failure occurs, it is difficult for the image formation unit to keep track of all functions affected by the failure. If a new optional unit is connected, the image formation unit will be notified of a new failure and the situation becomes more difficult to handle.

Further, in the output unit, when one failure occurs, it may or may not be necessary to stop the system depending on the place where paper is ejected. For example, when the place where paper is ejected is the top tray, if the interlock of the stack tray is opened, the system need not be stopped; when the place where paper is ejected is the stack tray, immediately the system needs to be stopped.

In such a case, the above-described configuration enables the operator to easily determine whether or not the system is to be stopped as he or she is notified of service available/unavailable information.

If the system becomes huge, the display role is shared among the units, whereby the operator can easily perform recovery operation.

The image formation system in the embodiment has a function of automatically ejecting paper remaining in the machine after jammed paper is removed in recovery processing from a paper jam when the paper jam occurred.

By using the ejection function to automatically eject paper remaining in the unit after the jammed paper is removed, in the invention, the remaining paper is ejected from the optional unit at the nearest position to the IOT 3 among the optional units connected to the output side of the IOT 3.

Accordingly, if a plurality of optional units are connected to the output of the IOT 3, the remaining paper is ejected from the optional unit at the nearest position to the IOT 3, whereby it is made possible to drastically shorten the recovery time.

As described above, according to the invention, when the optional units are cascaded, information as to what additional units are connected in what order with what number of the additional units is automatically detected in the image formation unit of the main unit when the system power is turned on. Thus, it is made possible to precisely keep track of the connection state of the optional units in the image formation unit to which the optional units are connected, so that the image formation system also becomes advantageous in system expandability and functional compatibility.

According to the invention, if the system scale becomes large as the optional units are cascaded, scaling up and down of the display are automatically switched so that the whole image of the system can be displayed in one screen of the display (monitor) placed on the image formation unit to which the optional units are connected. Thus, the user can understand the connection state of the optional units at a glance at the image formation unit to which the optional units are connected.

According to the invention, to connect a new optional unit to the system, it is made possible to automatically display and control without changing the setting, etc., of the image formation unit main body to which the optional units are connected.

According to the invention, when the system power is turned on, the function and limitation information are gathered from the optional units and thus what function and performance each optional unit connected to the system has can be automatically determined when the system power is turned on, so that it is made possible to display the functions on the display screen (UI) and control the optional units appropriately, and the validity of the specified job can be checked at an early stage.

According to the invention, if an unavailable state of the use function occurs because of a failure, etc., for example, in the optional unit, whether or not the basic function can be used can be easily determined. Thus, if a new optional unit is developed and attached and the image formation unit is notified of a new failure, the optional unit can be controlled easily. If the unavailable state of the use function occurs during the system operation, whether or not the system is to be stopped can be easily determined.

According to the invention, if the system scale becomes large as a plurality of optional units are connected, which optional unit the unavailable state of the use function occurs in can be determined on the display screen of the image formation unit of the main unit, and further the more detailed information on the unavailable state of the use function and the recovery processing method from the unavailable state of the use function can be precisely known on the display screen of each optional unit.

According to the invention, if a paper jam occurs, the remaining paper in the unit is ejected from the optional unit connected nearest to the output of the image formation unit to which the optional units are connected, so that it is made possible to drastically shorten the processing time required for recovery.

What is claimed is:

1. An image formation system comprising an image formation unit main body capable of being connected to a plurality of optional units in series, wherein the image formation unit main body has:

a detection section adapted to detect the type of each of the optional units connected to the image formation unit main body and the connection order by communicating in order from the optional unit which adjoins the image formation unit main body when system power is turned on; and a control section adapted to control the optional units and the image formation unit main body based on the information detected by the detection section, wherein when the image formation unit main body is turned on, the optional units subsequently from the optional unit, which adjoins the image formation unit main body.

2. The image formation system according to claim 1, wherein:

the image formation unit main body gives a start instruction to a first optional unit at a preceding stage and a first optional unit at a following stage when system power is turned on;

if an nth optional unit at the preceding stage is further preceded by an n+1th optional unit, the nth optional unit at the preceding stage returns a connection request to the image formation unit main body, connects to the image formation unit main body based on a connection signal from the image formation unit main body responding to the connection request, and gives a start instruction to the n+1th optional unit;

if the nth optional unit at the preceding stage is not further preceded by any optional unit, the optional unit at the preceding stage returns a connection request to the image formation unit main body, connects to the image formation unit main body based on a connection signal from the image formation unit main body responding to the connection request, and sends a signal indicating that the optional unit at the preceding stage is at a start stage in relation to the image formation unit main body;

if an nth optional unit at the following stage is further followed by an n+1th optional unit, the nth optional unit at the following stage returns a connection request to the image formation unit main body, connects to the image formation unit main body based on a connection signal from the image formation unit main body responding to the connection request, and gives a start instruction to the n+1th optional unit following the optional unit;

if the nth optional unit at the following stage is not further followed by any optional unit, the nth optional unit returns a connection request to the image formation unit main body, connects to the image formation unit main body based on a connection signal from the image formation unit main body responding to the connection request, and sends a signal indicating that the nth optional unit is at the termination stage in relation to the image formation unit main body; and the detection section issues an information request to the optional units connected to the image formation unit main body in order to collect information on the optional units and detects the type of each of the optional units and the connection order and the number of the optional units connected to the image formation unit main body based on the collected information.

3. The image formation system according to claim 1, wherein the image formation unit main body further has a display section adapted to display a whole image of the system including the optional units detected by the detection section on an enlarged or reduced scale so that the whole image of the system falls within one display screen.

4. The image formation system according to claim 1, wherein:

the image formation unit main body and the optional units has notification sections adapted to communicate with each other, respectively;

the optional units send performance information, which the optional units have, to the image formation unit main body when the system power is turned on;

the control section of the image formation unit main body controls the optional units based on the performance information sent from the optional units;

the image formation unit main body further has a display section; and the display section displays information indicating selectable function of each of optional units and information indicating limitations based on the performance information sent from the optional units.

5. The image formation system according to claim 1, wherein:

if an anomaly occurs in the optional unit, the optional unit sends information indicating occurrence of the anomaly and information indicating whether or not the basic function that the optional unit has can be provided to the image formation unit main body;

the control section of the image formation unit main body controls the optional units based on the information indicating whether or not the basic function can be provided, sent from the optional units;

the image formation unit main body further has a display section; and the display section displays information indicating selectable functions of the optional unit where the anomaly occurs and information indicating limitations on the selection based on the information indicating whether or not the basic function can be provided.

6. The image formation system according to claim 1, wherein:

the optional unit comprises an information display section adapted to display information indicating detailed contents concerning the abnormal condition and information indicating a recovery method from the abnormal condition;

when an anomaly occurs in the optional unit, the optional unit occurring anomaly notifies the image formation unit main body;

the image formation unit main body further has a display section; and the display section displays information indicating which optional unit the abnormal condition occurs in based on the notification of the abnormal condition notification section.

7. The image formation system according to claim 1, wherein the image formation unit main body comprises a section adapted to control a place where remaining paper in the system is to be ejected when a paper jam occurs to the optional unit which is behind a position of the remaining paper and nearest to the image formation unit main body.

8. The image formation system according to claim 1, wherein the optional units include a paper feeder for feeding record paper on which an image is to be recorded and an ejection unit for performing postprocessing to eject the record paper on which an image is recorded.

9. An image formation system comprising an image formation unit main body capable of being connected to a plurality of optional units in series, wherein the image formation unit main body has:
   a detection section adapted to detect the type of each of the optional units connected to the image formation unit main body, connection order and the number of the connected optical units when system power is turned on;
   a control section adapted to control the optional units and the image formation unit main body based on the information detected by the detection section;
   a starting section adapted to start the optional units adjacent to the image formation unit main body;

the optional units issue a connection request to the image formation unit main body if the optional units are not a termination of the optional units connected in series when the optional units are started by the starting section; and the optional units output a signal indicating that the optional unit is the termination of the optional units connected in series to the image formation unit main body if the optional unit is the termination of the optional units connected in series.

10. The image formation system according to claim 9 wherein the optional unit output function information of the started optional unit to the image formation unit main body when the optional unit is started by the starting section.

* * * * *